(12) United States Patent
Wang et al.

(10) Patent No.: US 10,802,624 B2
(45) Date of Patent: Oct. 13, 2020

(54) TOUCH DISPLAY PANEL AND TOUCH DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Qingpu Wang, Beijing (CN); Lei Zhang, Beijing (CN); Tsung Chieh Kuo, Beijing (CN); Zhenzhong Fang, Beijing (CN); Wenjin Fan, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 45 days.

(21) Appl. No.: 15/743,825

(22) PCT Filed: Jul. 27, 2017

(86) PCT No.: PCT/CN2017/094704
§ 371 (c)(1),
(2) Date: Jan. 11, 2018

(87) PCT Pub. No.: WO2018/032952
PCT Pub. Date: Feb. 22, 2018

(65) Prior Publication Data
US 2019/0004645 A1   Jan. 3, 2019

(30) Foreign Application Priority Data

Aug. 19, 2016   (CN) .......................... 2016 1 0697548

(51) Int. Cl.
*G06F 3/041*   (2006.01)
*G06F 3/044*   (2006.01)

(52) U.S. Cl.
CPC ............ *G06F 3/0412* (2013.01); *G06F 3/041* (2013.01); *G06F 3/044* (2013.01); *G06F 3/0416* (2013.01)

(58) Field of Classification Search
CPC ...... G06F 3/0412; G06F 3/0416; G06F 3/041; G06F 3/044
See application file for complete search history.

(56) References Cited

U.S. PATENT DOCUMENTS

| 2011/0001706 A1* | 1/2011 | Sanford | G06F 3/0412 345/173 |
| 2012/0306776 A1* | 12/2012 | Kim | G06F 3/044 345/173 |

(Continued)

FOREIGN PATENT DOCUMENTS

| CN | 102707856 A | 10/2012 |
| CN | 104698711 A | 6/2015 |

(Continued)

OTHER PUBLICATIONS

The Frist Chinese Office Action dated Jun. 1, 2108; Appln. No. 201610697548.5.

(Continued)

*Primary Examiner* — William Boddie
*Assistant Examiner* — Saifeldin E Elnafia

(57) ABSTRACT

The embodiment of the present disclosure discloses a touch display panel and a touch display device. The touch display panel includes a plurality of touch electrodes located in a display area, a plurality of electrode wire pins located directly above the display area, and a plurality of electrodes wires, each of the electrode wires is configured to directly connect one of the plurality of touch electrodes with one of (Continued)

the electrode wire pins, wherein, in a plan view of the touch display panel, the portion of each of the electrode wires located above the display area is of a straight line shape.

10 Claims, 2 Drawing Sheets

(56) References Cited

U.S. PATENT DOCUMENTS

| | | | |
|---|---|---|---|
| 2014/0184950 A1* | 7/2014 | Chu | G06F 3/0416 |
| | | | 349/12 |
| 2015/0054786 A1 | 2/2015 | Wang | |
| 2015/0220193 A1* | 8/2015 | Choe | G06F 3/0412 |
| | | | 345/174 |
| 2015/0223324 A1 | 8/2015 | Kim et al. | |
| 2015/0317013 A1 | 11/2015 | Kang et al. | |
| 2016/0291769 A1 | 10/2016 | Wang | |
| 2016/0291781 A1 | 10/2016 | He et al. | |
| 2016/0328056 A1 | 11/2016 | Lai | |
| 2016/0349895 A1* | 12/2016 | Long | G02F 1/13338 |
| 2017/0045964 A1 | 2/2017 | Huang et al. | |
| 2017/0046003 A1 | 2/2017 | Huang et al. | |
| 2017/0242518 A1 | 8/2017 | Liu et al. | |

FOREIGN PATENT DOCUMENTS

| | | |
|---|---|---|
| CN | 104699348 A | 6/2015 |
| CN | 104808883 A | 7/2015 |
| CN | 105093721 A | 11/2015 |
| CN | 105093722 A | 11/2015 |
| CN | 205247353 U | 5/2016 |
| CN | 105677112 A | 6/2016 |
| CN | 106125992 A | 11/2016 |

OTHER PUBLICATIONS

International Search Report and Written Opinion dated Oct. 25, 2017; PCT/CN2017/094704.

* cited by examiner

TOUCH DISPLAY PANEL AND TOUCH DISPLAY DEVICE

TECHNICAL FIELD

The embodiments of the present disclosure relate to a touch display panel and a touch display device.

BACKGROUND

As an input medium, touch screen provides users with better convenience than the keyboard and mouse. The touch screen realizes the input through finger touch, which makes the interaction between human and computer more direct and quick.

With the rapid development of the touch display market, the market of touch display devices used in occasions such as wearable devices, vehicular devices, medical devices, industrial control devices and the like has been rapidly developed. Various new forms of touch display devices have emerged. In order to meet the requirements of ease of use and aesthetic appearance, narrow frame design of a touch display device has become an inevitable trend.

In initial narrow frame design, narrow frame design is mainly aimed at two sides adjacent to a side on which the bonding pad is located. With the popularity of wearable devices, the side on which the bonding pad itself is located should also achieve narrow frame design.

SUMMARY

An embodiment of the present disclosure provides a touch display panel, comprising: a plurality of touch electrodes located in a display area; a plurality of electrode wire pins located directly above the display area; and a plurality of electrode wires, each of the electrode wires being configured to directly connect one of the plurality of touch electrodes with one of the electrode wire pins, wherein, in a plan view of the touch display panel, the portion of each of the electrode wires located above the display area has a straight line shape.

In an example, an upper edge of a row of the touch electrodes closest to the plurality of electrode wire pins is located on a first straight line, and partions of the plurality of electrode wire pins closest to the display area is located on a second straight line, and a distance between the first straight line and the second straight line is less than 3 mm.

In an example, the distance between the first straight line and the second straight line is greater than or equal to 0.3 mm.

In an example, each of the electrode wire pins extends in a same direction as each of the electrode wires.

In an example, the touch display panel further comprises a plurality of dummy pins.

In an example, at least a part of the plurality of dummy pins is located between adjacent two of the electrode wire pins.

In an example, the at least part of the plurality of dummy pins comprises a first dummy pin and a second dummy pin, the first dummy pin and the second dummy pin are configured to be grounded.

In an example, the first dummy pin and the second dummy pin are connected to each other through a ground wire.

In an example, in the at least part of the plurality of dummy pins, the first dummy pin is closest to one of the adjacent two of the electrode wire pins, the second dummy pin is closest to the other of the adjacent two of the electrode wire pins.

In an example, the ground wire is a fold line shaped ground wire.

In an example, the at least part of the plurality of dummy pins further comprise at least one of the dummy pins located between the first dummy pin and the second dummy pin.

In an example, the plurality of dummy pins substantially extends in a same direction as the plurality of electrode wire pins.

Another embodiment of the present disclosure provides a touch display device comprising the above-mentioned touch display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
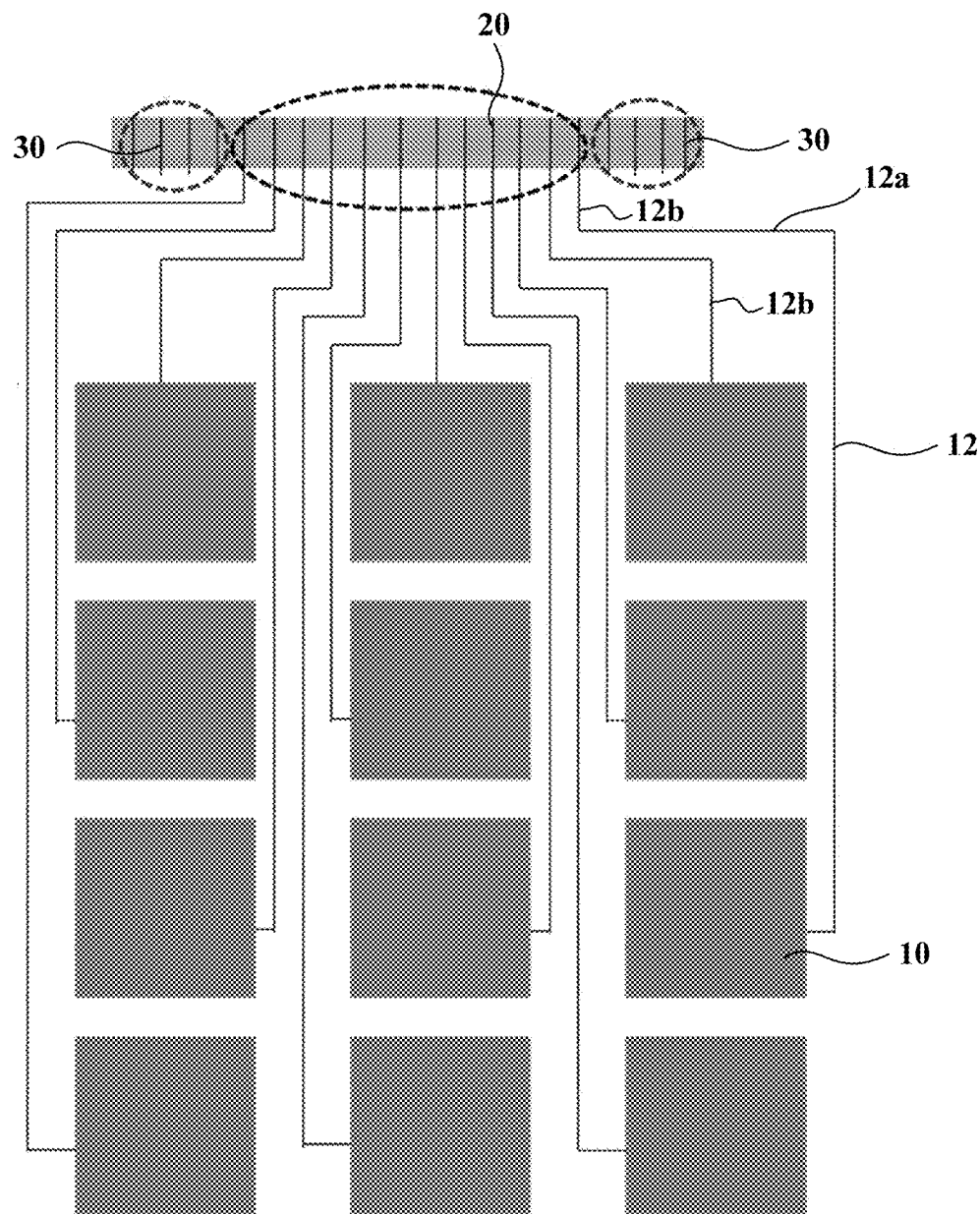
FIG. 1 is a schematic plan view of a touch display panel.

As illustrated in FIG. 1, a display area of a touch display panel is provided with a plurality of touch electrodes 10 arranged in an array, and each of the touch electrodes 10 is provided with an electrode wire 12 correspondingly. A bonding area is disposed in a peripheral area on a side of the display area. Usually, electrode wire pins 20 are provided in a middle area of the bonding area, and dummy pins 30 are provided in two sides of the bonding area (Usually, the dummy pins are arranged on both sides of the bonding area for improving anti-pullout test performance of the display device and so on). Each of the electrode wires 12 is connected with a corresponding electrode wire pin 20.

After being led out from the touch electrode 10, the electrode wire 12 is usually disposed in a fold line shape in a frame area between the display area and the bonding area. The fold line part includes a longitudinally disposed electrode wire 12b and a laterally disposed electrode wire 12a. In order to ensure touch performance of the touch display panel, a distance between two adjacent laterally disposed electrode wires 12a is not less than 0.03 mm, and a width of each laterally disposed electrode wire 12a is about 0.03 mm. Based on this design, a distance between the bonding area and the touch electrodes closest to the bonding area is usually 3 mm~6 mm, and a width of the bonding area is usually 1 mm. Therefore, a width of a frame on a side the bonding area located is usually 4 mm~7 mm. As a result, the width of the frame on the side of the bonding area of the touch display panel is relative large. It is difficult to achieve a narrow frame design.

In order to achieve a narrow frame design of a touch display device, the embodiments of the present disclosure provide a touch display panel and a touch display device.

Figure 2:
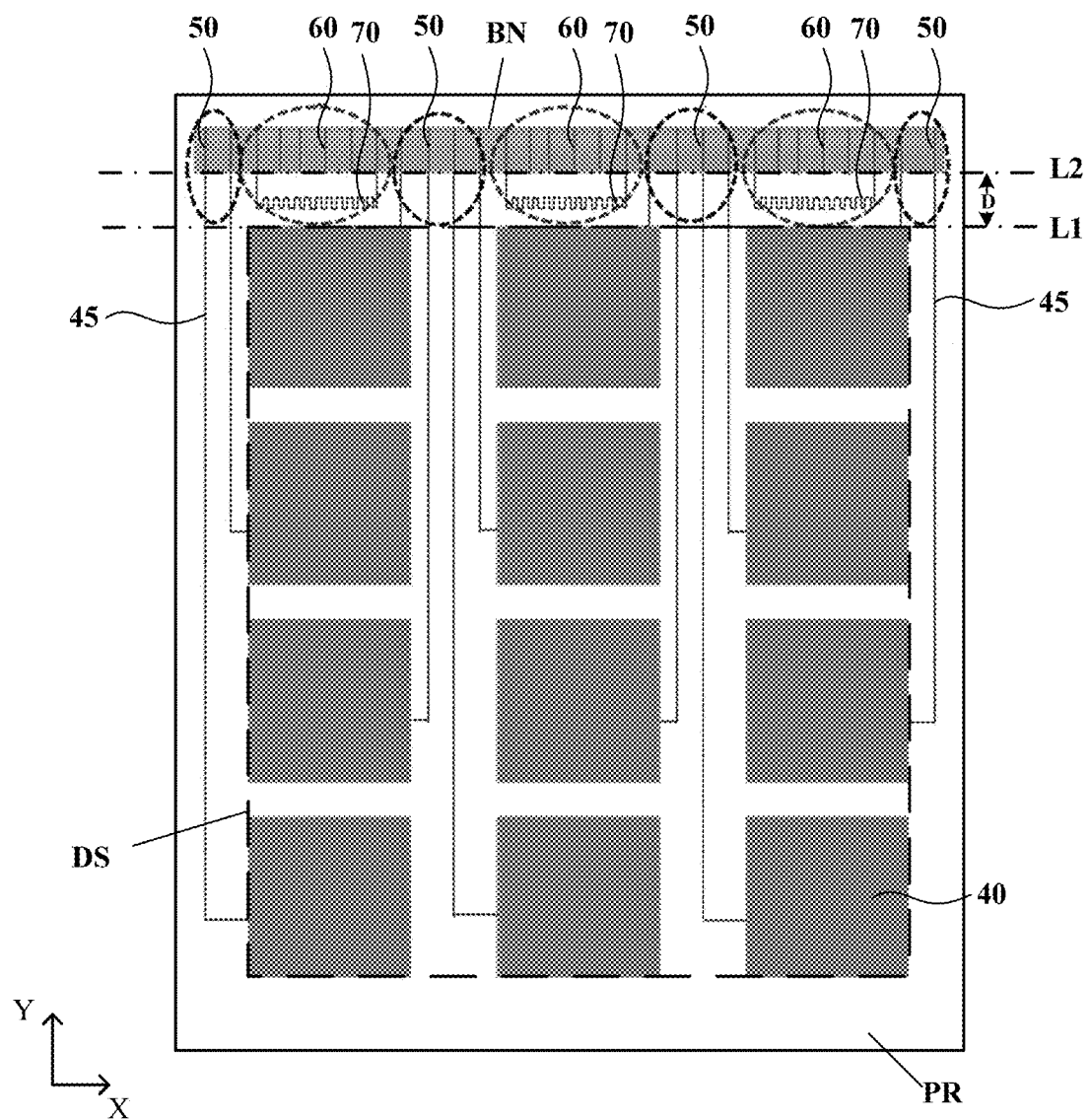
FIG. 2 is a schematic plan view of a touch display panel according to an embodiment of the present disclosure.

As illustrated in FIG. 2, the touch display panel provided by the embodiment of the present disclosure includes:

a plurality of touch electrodes 40 located in display area DS and arranged in an array;

a plurality of electrode wire pins 50 located in a bonding area BN and in one-to-one correspondence with the plurality of touch electrodes 40; and a plurality of electrode wires 45 configured to connect the respective touch electrodes 40 with the respective electrode wire pins 50, and the portion of each of the electrode wires 45 at a frame area PR between the bonding area BN and the display area DS being a straight line.

For example, the plurality of touch electrodes 40 are arranged as a plurality of electrode rows extending in an X direction and a plurality of electrode columns extending in a Y direction. Herein, the X direction is perpendicular to the Y direction.

Referring to FIG. 2, for example, the display area DS refers to a light emitting area of a touch display device (the area enclosed by the dashed line) and is configured to display an image. For example, the display area DS is of a rectangular shape. The display area DS has an upper edge, a lower edge, a left edge, and a right edge. The frame area PR refers to an area besides the light emitting area in a plan view of the touch display device. The frame area PR surrounds the display area DS and is in directly contact with any of the edges of the display area DS. The frame area PR is configured as a non-light emitting area. For example, the bonding area BN is located on an upper side of the display area DS and within the frame area PR, and a gap is provided between the bonding area BN and the display area DS.

In the embodiment of the present disclosure, each of the electrode wires 45 at the frame area between the bonding area and the display area is a straight line. The electrode wires 45 are not disposed in a fold line shape between the bonding area and an edge of the display area close to the bonding area. Thus a distance between the bonding area and the edge of the display area can be smaller, and a width of the frame on a bonding area side can be made narrower, which is beneficial for a narrow frame design of a touch display panel.

Based on the above design, a distance between the bonding area and the edge of the display area closest to the bonding area can be less than 3 mm. That is, in the plan view as illustrated in FIG. 2, a distance D between the first straight line L1 and a second straight line L2 in the Y direction is less than 3 mm, for example, is 2 mm. The first straight line L1 is located at an upper edge of the row of the touch electrodes closest to the electrode wire pins 50 of the display region DS, the second straight line L2 is located at the lower ends of the plurality of electrode wire pins 50 (as an example of portions of the edge of the plurality of the electrode wire pins 50 closest to the display area DS). For example, the distance D can be reduced to 0.3 mm. Herein, the first straight line L1 and the second straight line L2 are not a physical structure. For example, both the first straight line L1 and the second straight line L2 extend in the X direction.

The portion of each of the electrode wires 45 located above the display area DS has a straight line shape. That is, the portion of each of the electrode wires 45 located above the straight line L1 has a straight line shape.

The width of the bonding area is usually about 1 mm. Therefore, in the embodiment of the present disclosure, the width of the frame on the bonding area side is less than 4 mm, for example, is 3 mm. For example, the width of the frame on the bonding area side can be reduced to 1.3 mm. The width of the frame on the bonding area side is greatly reduced in the embodiment of the present disclosure, thereby realizing a narrow frame design of a touch display panel.

The extending direction of the electrode wire pins 50 is not limited. For example, the extending direction of the electrode wire pins 50 can be the same as the extending direction of the electrode wires 45, and of course can also be different. For example, as illustrated in FIG. 2, in one embodiment of the present disclosure, each of the electrode wire pins 50 extends in the same direction as each of the electrode wires 45.

For example, the respective electrode wire pins 50 are provided in the bonding area that intersects with the extending direction of respective electrode wires 45. In such a design, the electrode wire 45 can be directly connected to the corresponding electrode wire pin 50 after extending from the touch electrode 40, so that the electrode wire 45 located at the frame area between the bonding area and the display area is a straight line.

In an embodiment of the present disclosure, the touch display panel further includes a plurality of dummy pins 60 located in the bonding area. An extending direction of the dummy pins 60 is not limited. For example, the extending direction of the dummy pins 60 can be the same as that of the electrode wire pins 50, and can also be different. For example, in the embodiment of the present disclosure, the extending direction of the dummy pins 60 is the same as that of the electrode wire pins 50.

In an embodiment mode based on the above embodiment, the electrode wires 45 are disposed at a gap between adjacent columns of the touch electrodes 40. The electrode wire pins 50 are disposed in an area of the bonding area intersecting with the extending direction of the electrode wires 45. That is, the respective electrode wire pins 50 are disposed in the bonding area that is intersected with an extending area of the gap area between the respective columns of the touch electrodes 40. The respective dummy pins 60 are disposed in the bonding area that is intersected with an extending area of respective columns of the touch electrodes 40.

For example, it is provided that areas on both sides of each column of the touch electrodes are gap areas between adjacent columns of the touch electrodes, and the plurality of dummy pins is provided in the bonding area corresponding to at least one column of the touch electrodes. For example, the plurality of dummy pins is provided in the bonding area intersecting with all the extending areas of the respective columns of the touch electrodes 40.

In a case that the distance between the bonding area and the edge of the display area is small, edge touch control performance of the touch display panel may be affected to some extent. Therefore, in one embodiment of the present disclosure, among the plurality of dummy pins 60 disposed in the bonding area intersecting with the extending area of one column of the touch electrodes 40, at least two dummy pins 60 are respectively connected to the ground wire 70.

In the above embodiments, the at least two dummy pins are configured to be grounded. For example, the at least two dummy pins are respectively connected to the ground wire. With such a design, the ground wire 70 can provide a shielding effect to a certain extent, thereby reducing interference of the bonding area with the touch electrodes close to the bonding area, thereby improving edge touch performance of the touch display panel.

The specific shape of the ground wire 70 is not limited, and can be, for example, a straight line or a fold line. For example, the ground wire 70 is of a fold line shape. The fold line shaped ground wire helps to reduce the interference of the bonding area with the touch electrodes at the edge of the display area. Therefore, the fold line shaped ground wire has stronger shielding effect and is more conducive to improving edge touch performance of a touch display panel. In addition, the shape of the fold line is not limited, for example, the fold line can be a rectangular fold line, a triangle fold line, or the like, which is not limited herein.

In an embodiment mode based on the above embodiment, two dummy pins 60 respectively connected to the ground wire 70 are located on the outermost side. With such a design, the ground wire 70 has stronger shielding effect on the bonding area, and the interference of the bonding area with the touch electrode close to the bonding area is very small, thereby improving edge touch performance of the touch display panel.

The embodiment of the present disclosure provides a touch display device, which includes the touch display panel according to any one of the foregoing embodiments. The touch display device can realize a narrow frame design. The specific type of the touch display device is not limited, and can be a mobile phone, a tablet, or the like.

Obviously, those skilled in the art can make various modifications and variations to the present disclosure without departing from the spirit and scope of the disclosure. In this way, if these modifications and variations fall within the scope of the claims of the disclosure or the equivalent technologies thereof, the disclosure is also intended to include these modifications and variations.

The foregoing is merely exemplary embodiments of the present disclosure, and is not intended to limit the protection scope of the present disclosure. The protection scope of the disclosure is determined by the appended claims.

The application claims priority to the Chinese patent application No. 201610697548.5, filed Aug. 19, 2016, the entire disclosure of which is incorporated herein by reference as part of the present application.

The invention claimed is:

1. A touch display panel, comprising:
a plurality of touch electrodes located in a display area, the plurality of touch electrodes are arranged as a plurality of electrode rows extending in an X direction and a plurality of electrode columns extending in a Y direction, wherein the X direction is perpendicular to the Y direction;
a plurality of electrode wire pins located directly above the display area;
a plurality of electrode wires, each of the electrode wires being configured to directly connect one of the plurality of touch electrodes with one of the electrode wire pins, wherein the plurality of electrode wires are disposed at gaps between adjacent columns of the touch electrodes; and
a plurality of dummy pins, wherein the plurality of dummy pins are disposed in areas within a bonding area intersecting with extending areas of electrode columns of the touch electrodes;
wherein, in a plan view of the touch display panel, a portion of each of the electrode wires located above the display area is of a straight line shape;
wherein at least a part of a plurality of dummy pins is located between adjacent two of the electrode wire pins; and
wherein among the at least a part of the plurality of dummy pins disposed in the bonding area intersecting with the extending area of one column of the touch electrode, at least two dummy pins are respectively connected to a ground wire;
wherein a number of the plurality of dummy pins located between adjacent two of the electrode wire ins is greater than that of the at least two dummy pins that are respectively connected to a ground wire.

2. The touch display panel according to claim 1, wherein an upper edge of a row of the touch electrodes closest to the plurality of electrode wire pins is located on a first straight line, and portions of the plurality of electrode wire pins closest to the display area is located on a second straight line, and a distance between the first straight line and the second straight line is less than 3 mm.

3. The touch display panel according to claim 2, wherein the distance between the first straight line and the second straight line is greater than or equal to 0.3 mm.

4. The touch display panel according to claim 1, wherein each of the electrode wire pins extends in a same direction as each of the electrode wires.

5. The touch display pan& according to claim 1, wherein the at least two dummy pins include a first dummy pin that is closest to one of the adjacent two of the electrode wire pins, and a second dummy pin that is closest to the other of the adjacent two of the electrode wire pins.

6. The touch display panel according to claim 5, wherein the at least a part of the plurality of dummy pins further comprise at least one of the dummy pins located between the first dummy pin and the second dummy pin.

7. The touch display panel according to claim 1, wherein the ground wire is a fold line shaped ground wire.

8. The touch display panel according to claim 1, wherein the plurality of dummy pins substantially extends in a same direction as the plurality of electrode wire pins.

9. A touch display device comprising the touch display panel according to claim 1.

10. The touch display panel according to claim 1, wherein the ground wire is disposed between the plurality of dummy pins and the plurality of electrode wire pins.

* * * * *